US011139983B2

(12) United States Patent
Sandler et al.

(10) Patent No.: US 11,139,983 B2
(45) Date of Patent: Oct. 5, 2021

(54) SYSTEM AND METHOD OF VERIFYING RUNTIME INTEGRITY

(71) Applicant: CYBER ARMOR LTD., Jerusalem (IL)

(72) Inventors: Leonid Sandler, Jerusalem (IL); Benyamin Hirschberg, Jerusalem (IL)

(73) Assignee: CYBER ARMOR LTD., Jerusalem (IL)

( * ) Notice: Subject to any disclaimer, the term of this patent is extended or adjusted under 35 U.S.C. 154(b) by 272 days.

(21) Appl. No.: 16/508,318

(22) Filed: Jul. 11, 2019

(65) Prior Publication Data

US 2021/0014068 A1    Jan. 14, 2021

(51) Int. Cl.
| | |
|---|---|
| *G06F 21/00* | (2013.01) |
| *H04L 9/32* | (2006.01) |
| *G06F 21/71* | (2013.01) |
| *G06F 21/44* | (2013.01) |
| *G06F 21/60* | (2013.01) |

(52) U.S. Cl.
CPC ............ *H04L 9/3247* (2013.01); *G06F 21/44* (2013.01); *G06F 21/606* (2013.01); *G06F 21/71* (2013.01)

(58) Field of Classification Search
CPC ..... H04L 9/3247; G06F 21/44; G06F 21/606; G06F 21/71
See application file for complete search history.

(56) References Cited

U.S. PATENT DOCUMENTS

| | | | |
|---|---|---|---|
| 2015/0220745 A1 | 8/2015 | Nellitheertha et al. | |
| 2017/0041309 A1* | 2/2017 | Ekambaram | ............ G06F 21/44 |
| 2018/0181499 A1* | 6/2018 | Branco | ............... G06F 11/1048 |

(Continued)

FOREIGN PATENT DOCUMENTS

| | | |
|---|---|---|
| CN | 109993003 | 7/2019 |
| WO | WO 2018/058441 A1 | 4/2018 |
| WO | WO 2018/131004 | 7/2018 |

OTHER PUBLICATIONS

Chidambaram Pappa, Aswin, "Moving target defense for securing smart grid communications: Architectural design, implementation and evaluation" (2016). Graduate Theses and Dissertations. 15681. pp. 1-64. https://lib.dr.iastate.edu/etd (Year: 2016).*

(Continued)

*Primary Examiner* — Ghodrat Jamshidi (74) *Attorney, Agent, or Firm* — Pearl Cohen Zedek Baratz LLP (57) ABSTRACT

Systems and methods of verifying runtime integrity with a trusted execution environment (TEE) may include generating, by a processor in communication with the TEE, a secure communication channel between the TEE and at least one executable program attempting to communicate with the TEE, providing, by the processor, a moving target defense (MTD) module to the at least one executable program via the generated secure communication channel, wherein the MTD module comprises disposable polymorphic code, sending over the secured communication channel, by the processor: data, received from the at least one executable program, and a transformed runtime digest of the at least one executable program, and allowing, by the processor, communication with the TEE when the validity of the transformed runtime digest of the corresponding at least one executable program is verified.

20 Claims, 9 Drawing Sheets

(56) References Cited

U.S. PATENT DOCUMENTS

| | | | |
|---|---|---|---|
| 2018/0309786 A1* | 10/2018 | Apelewicz | H04L 67/12 |
| 2019/0042476 A1* | 2/2019 | Chhabra | G06F 12/1408 |
| 2019/0121736 A1* | 4/2019 | Sonnekalb | G06F 13/1673 |
| 2019/0305927 A1* | 10/2019 | Bhunia | H03K 19/17764 |
| 2020/0125475 A1* | 4/2020 | Iyer | G06F 8/433 |
| 2020/0133700 A1* | 4/2020 | Savir | H04L 9/14 |

OTHER PUBLICATIONS

Jinsoo Jang, Sunjune Kong, Minsu Kim, Daegyeong Kim, Brent Byunghoon Kang "SeCReT: Secure Channel between Rich Execution Environment and Trusted Execution Environment" NDSS Symposium 2015, Feb. 8, 2015.

Search Report for PCT International Patent Application No. PCT/IL2020/050748, dated Aug. 4, 2020.

* cited by examiner

SYSTEM AND METHOD OF VERIFYING RUNTIME INTEGRITY

FIELD OF THE INVENTION

The present invention relates to cryptographic integrity verification. More particularly, the present invention relates to systems and methods for cryptographic integrity verification with a trusted execution environment (TEE) in the runtime.

BACKGROUND OF THE INVENTION

Trusted Execution Environments (TEE) have become available on general purpose central processing units (CPUs) to be used as part of confidential computing as well as other secure data processing infrastructures. These TEEs provide additional levels of hardware enforced isolation for software that is running therein. Two distinctive capabilities are usually provided by such TEEs: internal software validity verification (usually performed when software is loading into the TEE); and access to internal cryptographic materials such as encryption keys. These keys are not accessible outside of the TEE, unless exposed by the TEE software itself.

A common problem in such environments is that, while the TEE hardware verifies the TEE internal software, the rest of the software that is running on a general-purpose CPU is considered untrusted. Some examples of the TEE implementation are the recently available software guard extension (or 'SGX', by 'Intel'), the platform security processor (or 'PSP', by 'AMD'), the 'TrustZone' (by 'ARM'), etc. All of these examples are local, namely running on the same chip as the main CPU. Some examples of remote TEEs, usually called the external secure devices, are USB-RSA dangles, cryptographic hardware security modules (or 'HSMs') and a remote root of trust servers. All these TEEs have different robustness characteristics and functional capabilities, but all of them have at least one common weakness, namely that they are incapable of identifying and authenticating the general-purpose application software that communicates with them and whom they are designed to "serve".

For example, a database software may encrypt and/or decrypt its data using an encryption and/or decryption interface provided by the TEE which ensures the secrecy of the key. However, the only reason such a database would encrypt its data is to prevent data exfiltration. Since the software outside of the TEE is considered untrusted, it must be assumed to be compromised at some point, and the software outside of the TEE may ask the TEE to decrypt data mimicking the behavior of the original database software. Once decrypted, that data can be used or exposed by the compromised software, making powerful TEE key protection practically ineffective.

In another example, a system can use secure communication protocols and/or apply network isolation and/or use shared secrets or certificate-based authentication. While having some of these methods is better than nothing, none of them can actually help if the actual application is compromised. Such a compromised application could continue using any of the above methods because none of them is dependent on the application code integrity or an injection of an additional unsanctioned code. It is possible that some general-purpose applications can deploy proprietary self-protection methods and, therefore, may be more resilient than others. However, this will still not allow the TEE to verify their integrity during the execution session, for instance verify integrity by checking consistency between a cryptographic hash of the original code and of the potentially compromised code. Contemporary authentication best practices call for usage of multi-factor authentication (MFA) in order to strengthen the system security. However, when it comes to two pieces of software communicating with each other, the amount of additional authentication factors is very limited, and they are practically unreliable. When the compromised software is running on the same device as the legitimate software and/or when the compromised software is on the same device as the TEE, like in the 'SOX' case, there are no additional authentication factors.

SUMMARY OF THE INVENTION

Some embodiments include verifying runtime integrity with a trusted execution environment (TEE), including for example generating, by a processor in communication with the TEE, a secure communication channel between the TEE and at least one executable program attempting to communicate with the TEE, providing, by the processor, a moving target defense (MTD) module to the at least one executable program via the generated secure communication channel, wherein the MTD module includes disposable polymorphic code, sending over the secure communication channel, by the processor: data, received from the at least one executable program, and a transformed runtime digest of the at least one executable program, and allowing, by the processor, communication with the TEE when the validity of the transformed runtime digest of the corresponding at least one executable program is verified.

In some embodiments, generating the secure communication channel may include at least one of encrypting and signing of: the data and the transformed runtime digest (e.g., by the processor). In some embodiments, the received data and the transformed runtime digest may be decrypted at the TEE (e.g., by the processor). In some embodiments, the signature of the received data and the transformed runtime digest may be checked (e.g., by the processor). In some embodiments, at least one memory relocation of at least one data sequence in the data, the at least one memory relocation may be corrected accordingly (e.g., by the processor). In some embodiments, a time limit may be applied on the verification in a predefined time period. In some embodiments, an executable interpreter may be applied on the data (e.g., by the processor).

In some embodiments, all of the verified executable programs may be mapped (e.g., by the processor) during communication with the TEE, as well as the corresponding address in the stack, and a communication pattern may be determined for at least one executable program during communication with the TEE. In some embodiments, at least one executable program may include at least one of multi-module native code and interpreted code. In some embodiments, communication with the TEE may be allowed (e.g., by the processor) only with previously cryptographically verifying executable programs.

Some embodiments include a trusted execution environment (TEE), and a processor in communication with the TEE, the processor configured to: provide a moving target defense (MTD) module to at least one executable program attempting to communicate with the TEE via a generated secure communication channel, wherein the MTD module includes disposable polymorphic code, encrypt data, received from the at least one executable program, and a transformed runtime digest of the at least one executable program, and allow communication with the TEE when the validity of the transformed runtime digest of the corresponding at least one executable program is verified.

In some embodiments, for the secure communication channel, the processor may be configured to carry out at least one of: encrypting the data and the transformed runtime digest, and signing the data and the transformed runtime digest. In some embodiments, the processor may be configured to carry out at least one of: decrypting the received data and the transformed runtime digest at the TEE, and checking the signature of the received data and the transformed runtime digest. In some embodiments, the processor may include a set of signature generation tools to generate at least one signature for verification. In some embodiments, the processor may be further configured to identify a predefined data sequence to identify a position of code segment. In some embodiments, the processor may be further configured to identify at least one memory relocation of at least one data sequence in the data, and correct the at least one memory relocation accordingly.

In some embodiments, the processor may be further configured to apply a time limit on the verification in a predefined time period. In some embodiments, the predefined time period may be in the range of several milliseconds to several seconds. In some embodiments, the processor may be further configured to apply an executable interpreter on the data. In some embodiments, the processor may be further configured to map all of the verified executable program segments during communication with the TEE, as well as the corresponding address in the stack, and determine a communication pattern for at least one executable program during communication with the TEE. In some embodiments, the processor may be further configured to allow communication with the TEE only with previously cryptographically verifying executable programs.

In some embodiments, at least one executable program may include at least one of multi-module native code and interpreted code. In some embodiments, the TEE may be implemented by a computing component external to the processor. In some embodiments, the TEE may be implemented on a computing device of the processor.

An embodiment for verifying runtime integrity with a TEE may include generating, by the processor, a secure environment between the TEE and at least one executable program attempting to communicate with the TEE; providing, by the processor, disposable polymorphic code to the at least one executable program via the generated secure environment; sending, by the processor, data, received from the at least one executable program and the transformed runtime digest, to the TEE; and allowing, by the processor, communication with the TEE when the validity of the transformed runtime digest of the corresponding at least one executable program is verified.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
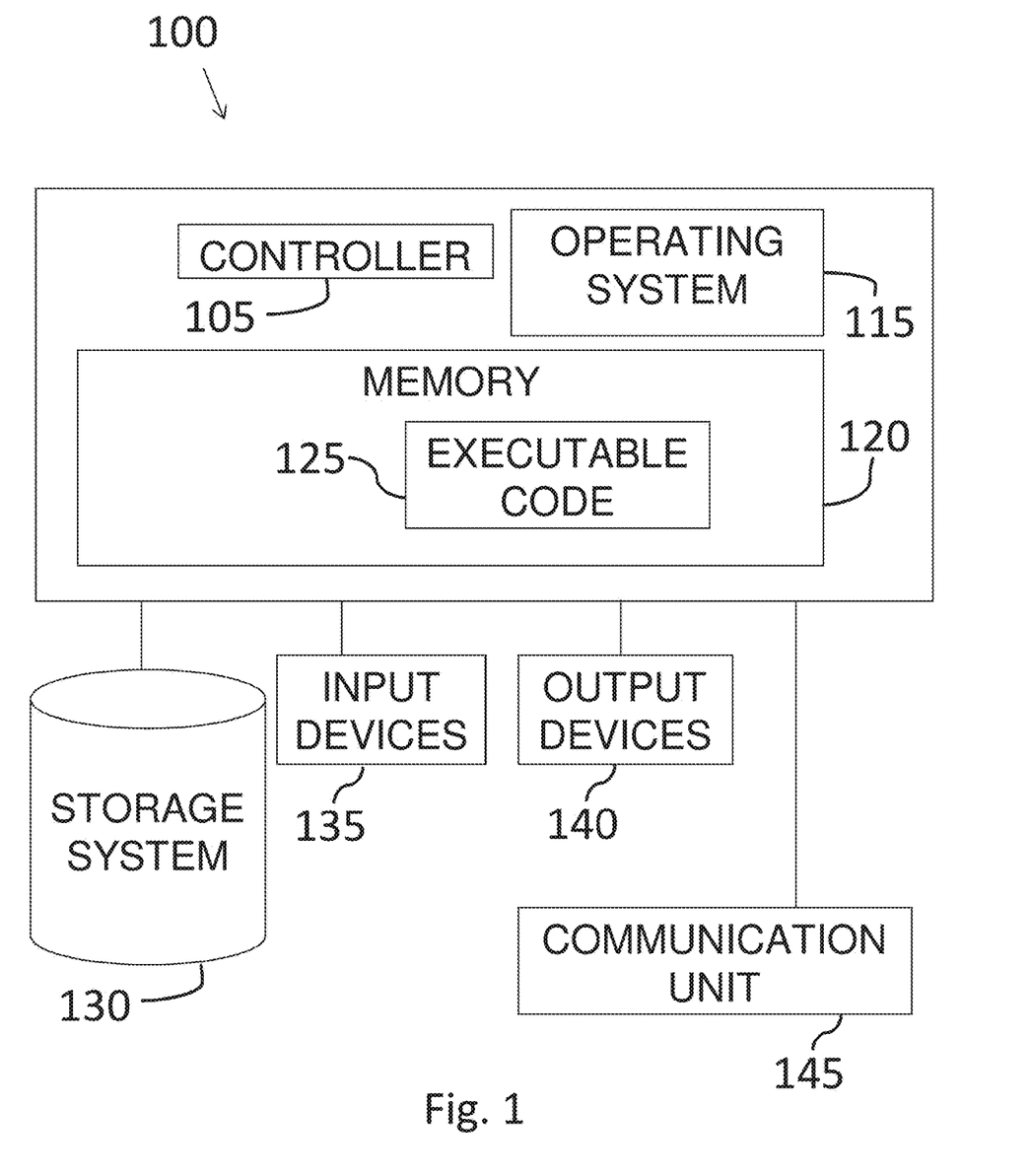
FIG. 1 shows a block diagram of an exemplary computing device, according to some embodiments of the invention.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device 100, for example, to act as the various devices or the components shown in FIG. 2. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (MC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be, for example, a memory, a disk drive, or a USB flash memory, encoding, including or storing instructions, e.g., computer-executable instructions, which, when executed by a processor or controller, carry out methods disclosed herein. The storage medium may include, but is not limited to, any type of disk including, semiconductor devices such as read-only memories (ROMs) and/or random-access memories (RAMS), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Methods and systems according to some embodiments of the invention may provide software miming inside a TEE, with cryptographic visibility to identify and/or authenticate the general-purpose application software running outside of the TEE and establish secure communicating between the application and the TEE services. Thus, if software integrity is verified by the TEE continuously throughout the entire execution session, such software may behave as designed and therefore may not expose the decrypted data to unauthorized parties. Furthermore, communication of the TEE may be ensured to occur only with the signed application code and no other code even if it was loaded in the same process memory, which may happen when attackers succeed in injecting their code into the legitimate application process, for example with dynamic-link library (DLL) injection attacks or file-less malware attacks, as achieved by the encryption and signing of the communication traffic between the TEE and a moving target defense (MTD) module attached to the application.

Methods and systems according to some embodiments of the invention may provide a way for trusted software that is running in the TEE environment to cryptographically authenticate an external software module that is served and/or supported by the TEE. The trusted TEE software may gain runtime (e.g., live during execution of the external software) visibility on the "health" of the external software that is running outside of the implicitly trusted TEE, potentially turning the untrusted software into trusted software.

Figure 2:
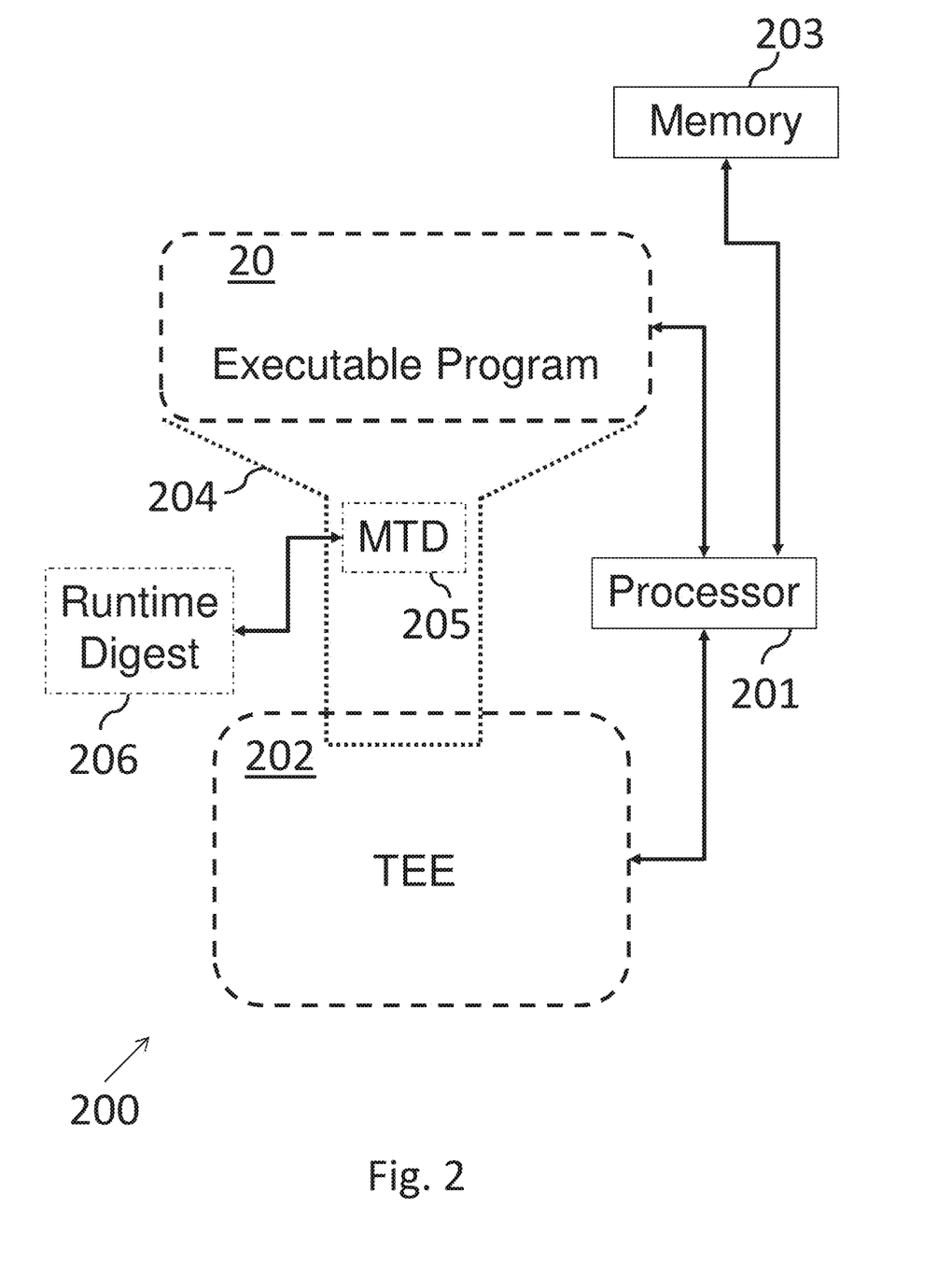
FIG. 2 shows a block diagram of a system for verifying runtime integrity with a trusted execution environment (TEE), according to some embodiments of the invention.

Reference is now made to FIG. 2, which shows a block diagram of a system 200 for verifying runtime integrity with a TEE, according to some embodiments. In FIG. 2, hardware elements are indicated with a solid line and the direction of arrows may indicate the direction of information flow. The TEE may be considered as a fully secured entity that contains all the necessary functionality and data to conduct runtime integrity verification.

The system 200 may include at least one processor 201 (e.g., such as the controller 105, shown in FIG. 1) in communication with a trusted execution environment (TEE) 202, for instance to manage communication with the TEE 202 and verify runtime integrity of other software. In some embodiments, the TEE 202 may be implemented on the same computing device of processor 201 (e.g., on the same PC, tablet, etc.), for instance the TEE 202 may be implemented as a separate secured hardware element (on the computing device) that may be activated by the processor 201. In some embodiments, the TEE 202 may be implemented on a computing device external to the computing device of processor 201 (e.g., on a dangle connected to a computing device of processor 201), for instance the TEE 202 may be implemented as a separate secured hardware element (on the computing device) that may be activated by the processor 201, such that the external device with the TEE 202 may verify integrity of programs running on the (local) computing device. In some embodiments, the TEE 202 may be implemented as a secured software environment, for instance enforced by code executed by the processor 201.

In some embodiments, the system 200 may sign and/or verify code of an executable program 20 in communication with processor 201, for instance verify integrity of the executable program 20 (e.g., by checking consistency of a cryptographic hash or verifying that the data was signed by the expected entity). If the executable program 20 is not verified, the processor 201 may block communication to that program. The processor 201 may detect a communication attempt or identify the executable program 20 attempting to communicate with the TEE 202, and system 200 may accordingly perform verification of runtime integrity for the potentially untrusted executable program 20. An executable software process may be constructed from multiple code segments, where each such segment represents an executable file (e.g., exe, dll or their 'Linux' counterparts). While a single executable segment is described, the same may similarly apply for multiple executable segments.

Before the signature verification starts, the verification code executed by system 200 may find the necessary code fragment in a memory module 203 (e.g., such as the memory 125, shown in FIG. 1), in runtime. However, some of the metadata from the executable file as well as the internal logic of the operating system loader itself may be missing when the verification code starts (e.g., by processor 201). For example, when the verification code needs to find the beginning of the being-verified executable code section in the memory 203, there is no sufficient coverage of the corresponding operating system application programming interface (API) to retrieve this information. While access to the entire memory range allocated for a particular executable file may be available, there is no knowledge where exactly the signed portion starts. A signing tool to prepare the signature of the executable program 20 may have a benefit of seeing the executable file header in order to obtain this information, but this header may not be available in the runtime.

Figure 3A:
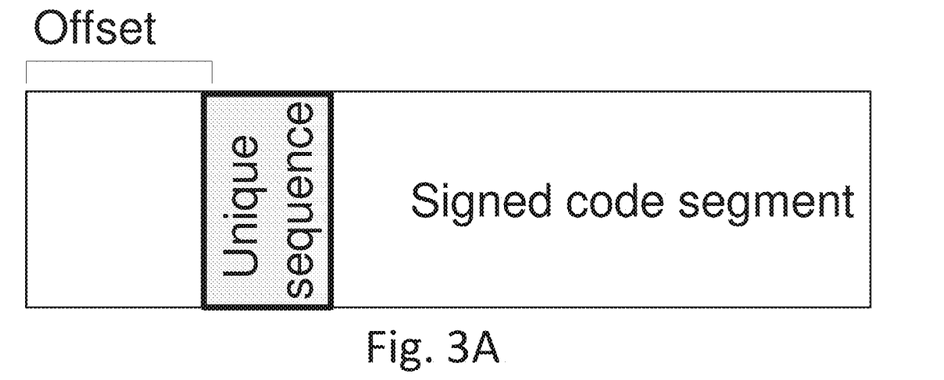
FIG. 3A schematically illustrates targeting a unique sequence to identify a position of the beginning of a signed code segment, according to some embodiments of the invention.

Reference is now made to FIG. 3A, which schematically illustrates targeting a unique sequence to identify a position of the beginning of a signed code segment, according to some embodiments. The signing tool may find a unique sequence of bytes in the being-signed segment (e.g., 6-8 byte sequence) and calculate its offset from the beginning of the signed segment. The signing tool may have necessary time to find such a sequence and make sure it appears in the code segment only once, for instance prior to communication with the TEE 202 and execution of the verification code. In some embodiments, the signing tool may increase the size of the sequence, for instance if 6-8 bytes are not enough for the uniqueness. The result sequence may be placed in the signature metadata along with its offset from the beginning. Thus, with the identified sequence, the determined offset may be used to identify the beginning of the signed segment.

It should be noted that traditional file digest-based methods cannot be used on the executable code because the system loader only takes some parts of the executable file and also changes them (especially the part that contains the code itself) while they are loaded from the disk file to the memory where they are executed. An example of a known mechanism that alters the code segment is code relocation. This mechanism allows operating system to load the executable file at arbitrary memory locations. There are other operating system and software development tools mechanisms that alter the code segment at the time of loading. Therefore, the signing mechanism may take into account such mechanisms and "compensate" for the changes they make to the executable code, ensuring that the execution logic was not altered.

Figure 3B:
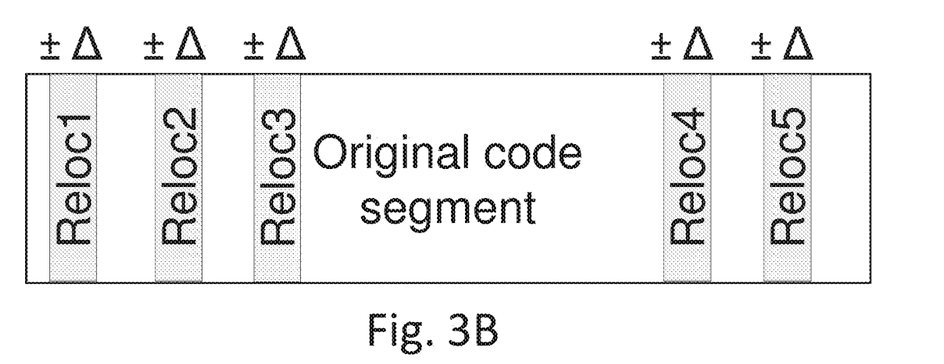
FIG. 3B schematically illustrates a code relocation mechanism, according to some embodiments of the invention.

Reference is now made to FIG. 3B, which schematically illustrates a code relocation mechanism, according to some embodiments. The code relocation mechanism (e.g., executed by processor 201) may shift and/or correct the code segment in the memory by adding or subtracting the same "delta" value to or from all the points that are specified in the executable file header with relocation segments (e.g. Reloc '1' . . . Reloc 'N'). In some embodiments, once at least one memory relocation of at least one data sequence in the data is identified (e.g., by the processor 201) the at least one memory relocation may be corrected accordingly. Such an operation may change the "traditional" code segment digest (calculated over the entire code section) which therefore may no longer be used to verify the code validity.

Figure 3C:
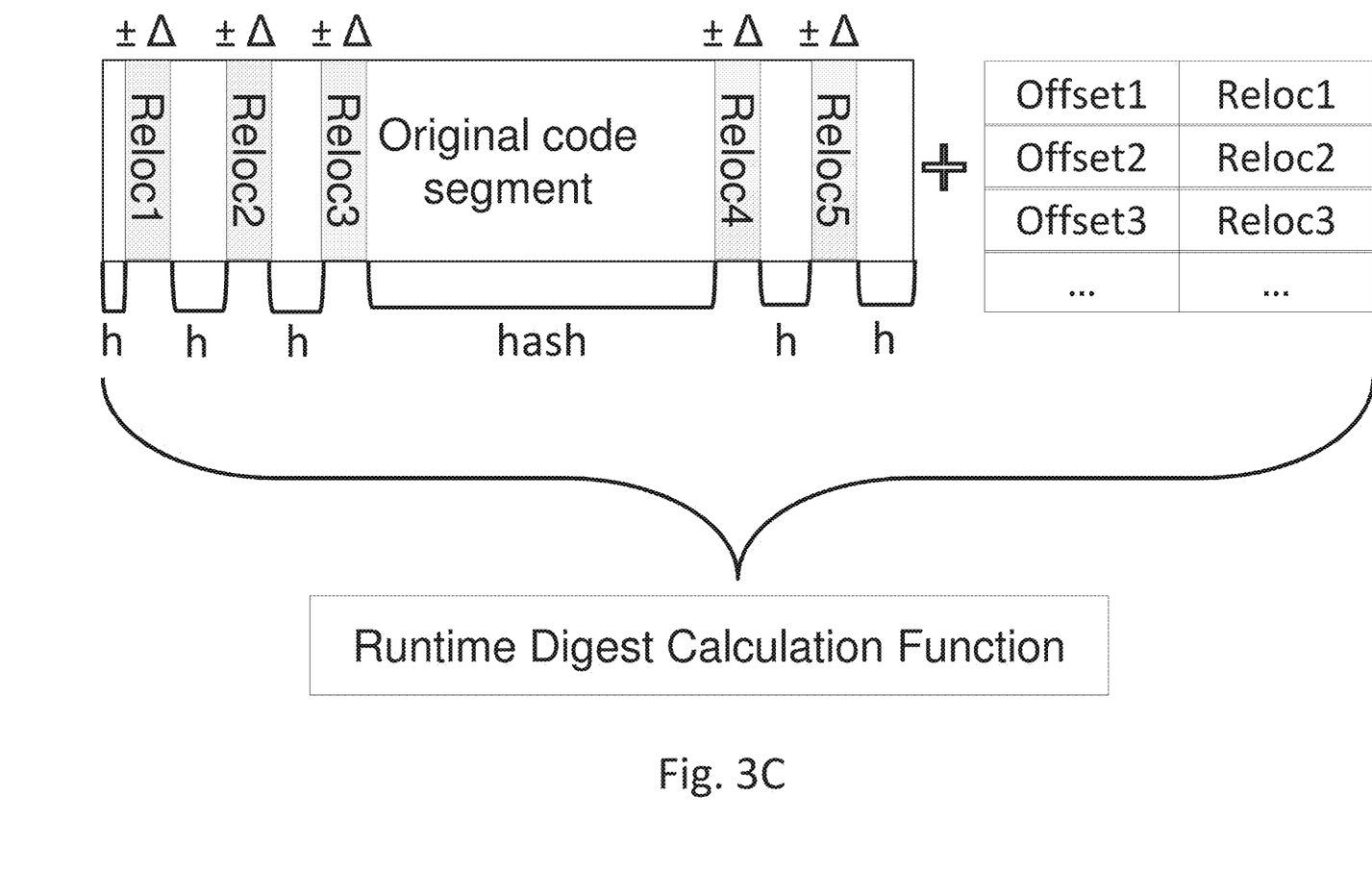
FIG. 3C schematically illustrates applying hash on the relocated segments to calculate a "runtime digest"

Reference is now made to FIG. 3C, which schematically illustrates applying hash to the relocated segments to calculate a "runtime digest", according to some embodiments. The hash calculation may be performed only over the unchanged parts of the code segment. Additional hash may be performed over the original values and their corresponding locations with the known positions of the relocation segments. In some embodiments, the verification code may ensure that all the relocation points were shifted by the same "delta" value and that after the shift, the address remains within the signed code segment. A message digest may be a cryptographic hash function containing a string created by a one-way hashing algorithm, such that the runtime digest may be a digest of the software code as captured in runtime.

Some code section altering mechanisms may require some fragments of the code to be excluded from the hash calculation. If such mechanisms are present, the offset and/or the size of the excluded fragment may also be covered by the hash calculation (e.g., as shown in FIG. 3C). The signing mechanism may determine the nature of every altered code segment part and choose how to treat it, for example verify the delta or ignore. It should be noted that the software signing may occur in the safe environment, and, therefore, all the above calculations may be performed by a simple unprotected utility software (e.g., initiated by processor 201).

At the verification stage the final hash result may match the value calculated by the signing software. However, the verification may occur in a potentially hostile environment. Therefore, from the potential attacking attempts standpoint, it is not sufficient to just calculate and transfer the final hash result to the TEE 202 for the comparison, because it may be deterministic and can be "pre-canned" by the attackers.

Reference is made back to FIG. 2. According to some embodiments, the integrity of the application code or executable program may be verified and/or proven to the TEE 202 software, Therefore, the calculation of the runtime digest 206 and the delivery of the result into the TEE 202 may be implemented in the way in which attackers cannot interfere, alter or spoof the result on the way to the TEE. The processor 201 may generate a secure communication channel 204 between the TEE 202 and the potentially untrusted executable program 20 to carry out the verification code therethrough. The secure communication channel 204 may be used in order to deliver the moving target defense (MTD) module 205 to the executable program 20. In some embodiments, the secure communication channel 204 may be generated as an additional and/or secure (software) environment for data transfer, to ensure that the TEE 202 communicates only with the potentially untrusted executable program 20 that is being verified (e.g., to determine if it is trusted or untrusted).

Figure 4A:
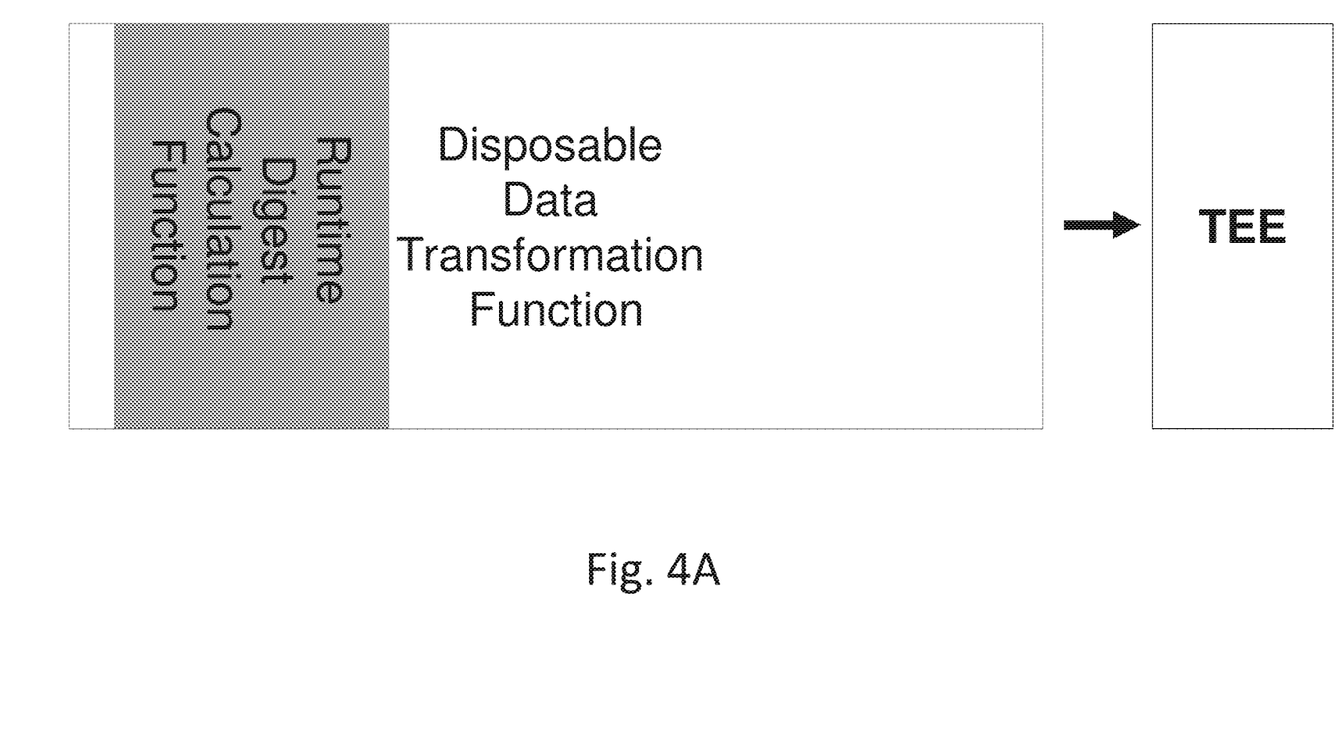
FIG. 4A schematically illustrates applying moving target defense (MTD) transformation on the runtime digest, according to some embodiments of the invention.

Reference is now made to FIG. 4A, which schematically illustrates applying MTD transformation (or augmentation) on the runtime digest, according to some embodiments. The MID 205 may include code calculating a transformed runtime digest 206 by the executable and/or interpreted code provided by the TEE 202 (or another trusted entity on behalf of the TEE) to the being-verified application or executable program 20. In some embodiments, the MTD module 205 may include disposable polymorphic code, such that a disposable code delivered by the TEE 202 may be (e.g., uniquely) generated for each communication and thus cannot be reused by a malicious party. The runtime digest calculation function may be incorporated into a broader data transformation function, the code of which may be implemented using polymorphic code generation technology, which means that every instance of such code may be different from the other instances and only used once. At least one polymorphic code transformations and/or augmentations and/or overlay may be applied (e.g., by processor 201). For instance, the TEE 202 may allow the verification code to run for a very short period of time (e.g., usually milliseconds to several seconds timer) in order to prevent code reverse-engineering attempts. In some embodiments, a time limit may be applied to the verification, for example using a predefined time period in the range of several milliseconds to several seconds.

Thus, even if attackers know the value of the runtime digest, they still do not know the actual value that the TEE is expecting to receive because the broader data transformation function is not known ahead of time. Since the code is implemented as polymorphic, the data transformation may be mixed with the runtime digest calculation in a way such that it is not trivial to separate them. An attempt to reverse engineer (e.g., disassemble) the code may take significantly more time than allowed by the TEE timer expecting the result back and therefore such approach may fail.

Figure 4B:
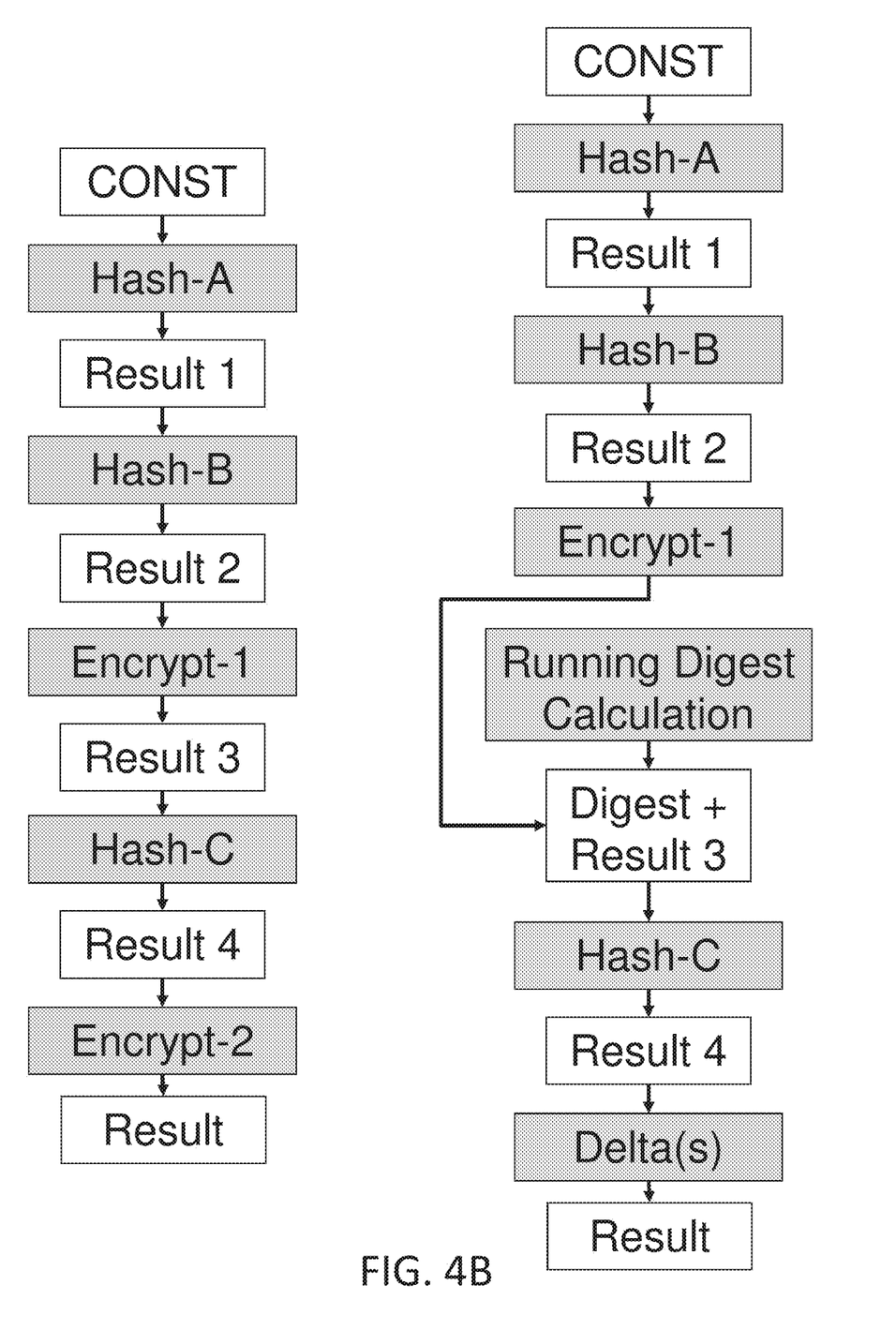
FIG. 4B schematically illustrates chaining based construction of the MTD transformation code, according to some embodiments of the invention.

Reference is now made to FIG. 4B, which schematically illustrates chaining based construction of the MTD transformation code, according to some embodiments. In addition to the runtime digest calculation, the data transformation function must also perform the verification of the "delta(s)" and any additional steps that may be required by different types of the code segment altering mechanisms. For example, the disposable data transformation function may include multiple data transformation elements. Some of these elements may have cryptographic nature (e.g., hash or encryption) while others may perform any other types of data processing. The requirement for this function is to be disposable and unpredictable. This might be achieved by chaining different transformation items in the way where the output of the previous step becomes the input of the next one.

Even if the total amount of such transformation items is limited, the number of combinations may still provide practically unlimited amount of transformations and completely unpredictable data transformation function, so that the only way to obtain the final result in a sufficient time, is to run it. As mentioned above, the runtime digest calculation function may be embedded at an unpredictable location into this chain. Since the TEE knows the valid runtime digest value, it may calculate the final result of the disposable data transformation function. If the final result of the disposable data transformation function was delivered to the TEE before the tinier has expired, it may be regarded by the TEE as a valid code signature, and, therefore, the TEE may communicate with such an application and fulfil its requests accordingly. In some embodiments, this verification process may be initiated by the TEE software at any point and may be repeated as many times as necessary according to the TEE internal policy.

Reference is made back to FIG. 2. According to some embodiments, the single segment integrity verification process described above may be applied to multiple executable segments loaded into the process memory simultaneously or one by one. In addition to the code segments, the signature verification may require covering additional fragments of the original executable file using the same verification principles. For example, such fragments may be at least one of the "constants section", "v-tables", "Import Address Tables (TAT)", etc.

In case that some dynamic libraries were unavailable at the time of the signature generation, a predefined policy may be provided to allow or prohibit such situation. If such a situation is allowed by the predefined policy, the integrity verification mechanism may identify and report all the code segments (with corresponding library names) for which the signatures are missing but may still calculate their initial; startup digest and make sure that this digest remains unchanged throughout the application execution session.

Figure 5:
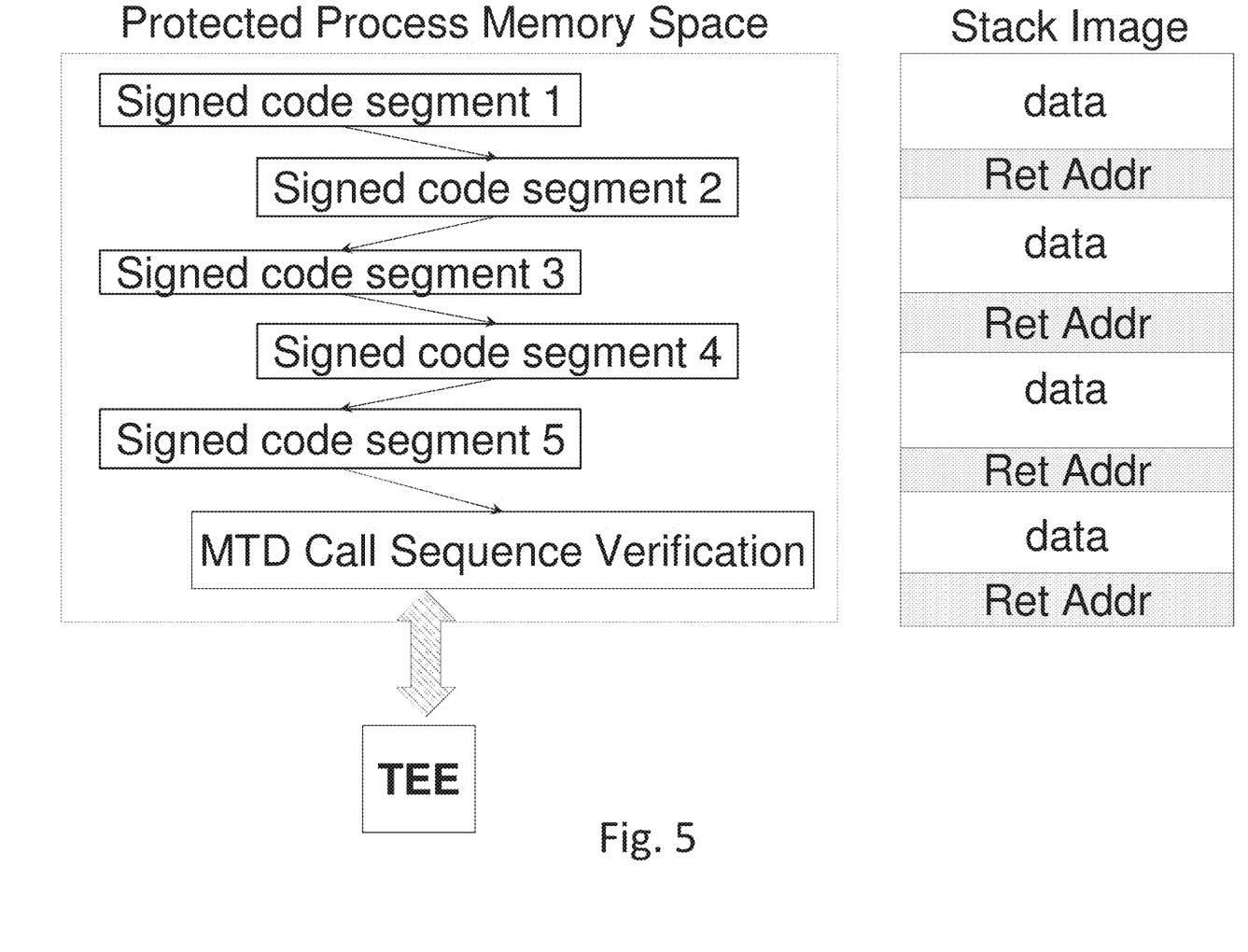
FIG. 5 schematically illustrates calling behavior verification of the correct behavior of the previously verified code, according to some embodiments of the invention.

Reference is now made to FIG. 5, which schematically illustrates calling behavior verification of the correct behavior of the previously verified code segments, according to some embodiments. When all the code segments are verified, the next step may be to verify that TEE API calls are performed by the previously verified code at it was designed. This verification may be required in order to prevent unauthorized calls made by injected unsigned software that managed to penetrate the process. In order to achieve this, all the communication between the TEE 202 and the executable program 20 must occur via the disposable code of the MIT) 205 provided to the executable program 20 by the TEE 202. In some embodiments, the disposable code to calculate the transformed runtime digest 206, delivered by the TEE 202, may be (e.g., uniquely) generated for each communication to prevent other parties disguising their code as the executable program 20. This may be the same code module that contains the data transformation function. It may have the same robustness and polymorphic characteristics. In addition to the tracking of the caller, this module may also encrypt and/or sign the communication between the executable program 20 and the TEE 202. The code that performs the communication protection may be tightly coupled with the data transformation function and the runtime digest calculation. Same as above, the overall resilience of this mechanism relies on the polymorphic nature of the MIT) technology used to protect it. In some embodiments, the communication channel 204 may be secure due to the encryption and/or signing between the executable program 20 and the TEE 202. In some embodiments, encrypted data may be accordingly decrypted, and/or signatures of signed data may be accordingly checked (e.g., checked to match a corresponding cryptographic key).

When functions call each other (e.g., a runtime digest calculation function as shown in FIGS. 4A-4B), they may leave a return address on the stack. There may be many different legitimate call sequences performed by real applications. In order for all of them to be identified, an example system for verifying runtime integrity may be initially trained. In some embodiments, the processor 201 may map all of the verified executable programs segments during communication with the TEE 202, as well as the corresponding address in the stack. Having a complete map of the signed and verified code segments, the call sequence verification code may scan the stack at each call and take a note of two parameters: the offset inside signed code segment that makes the call and the amount of data on the stack between the return addresses.

The return address may be identified because it must point to one of the known signed segments. The size and the position of each segment may also be known. However, the position of the same segment may be different at different execution sessions. Therefore, the training may only take into account the offset inside the segment from which the call was made. These offsets and the amount of data between them become a call "fingerprint" for every call. When the training is over, the call sequence verification code may switch to the enforcement mode and verifies the call fingerprint for every call that attempts to access the TEE 202. This fingerprint may be compared with the current map of the signed code segments in order to confirm a valid sequence of the call, which may be allowed to proceed to the TEE 202. It should be noted that the training may be performed in the "safe" environment in order to ensure correct behavior of the code. However, when multiple clients use the same software product, the training data from one client may also be valid for the others.

According to some embodiments, an interpreted application execution process may include regular native executable interpreter and a script or a pseudo-code that is interpreted and executed by the interpreter. Such scripts may be loaded into the process memory as data files (as opposed to the native code that is loaded as an executable) The behavior of the interpreted applications may be determined by the behavior of the interpreter and the scripts that it runs. Therefore, the integrity of the interpreted application may start from the integrity of the interpreter itself. The interpreter code may be signed and verified as any other native application. Then, all the script files that are going to be loaded by the interpreter are also signed (and may potentially be encrypted as well). In this manner, every script file that an interpreter attempts to read is verified upon this reading. In some embodiments, scripts may load other scripts. However, if the original script is verified, it may only attempt to load other valid/permitted scripts, which will also be checked for their integrity upon the loading.

In some embodiments, it may also be possible to distinguish between the interpreter that is reading a script file and the interpreter executing an application logic and just reading a regular data file. Once this distinction is made, every call made through the script reading sequence, may be mandatorily forced to verify the signature of the incoming script. The interpreter integrity verification may be performed continuously throughout the entire application execution session like other native applications).

In the case where interpreted application may receive a script from a different software component if such application only communicates with other applications, the overall solution architecture may ensure that such application only communicates with applications whose integrity is verified by the same or similar means.

According to some embodiments, interpreters that utilize a just-in-time (JIT) compiler may perform the interpretation in three steps: read the script file just like the interpreter explained above; perform runtime compilation into a regular native code fragment; and run the native code fragment. It is at the sole discretion of the interpreter what part of the script to compile and what part to use for the classic interpretation. It should be noted that, if the interpreter (including the JIT) is healthy and the input script is healthy, the result code may also be healthy at the time of the load. However, as any other native code, it may be exploited post-deployment. Therefore, the signature verification code may track the appearance of any new code fragment produced by the JIT and generate its digest when the HT operation is finished (the interpreter turns off the write access permission to such memory region). Thus, from this moment on, the digest may be verified until this region is deleted.

Figure 6A:
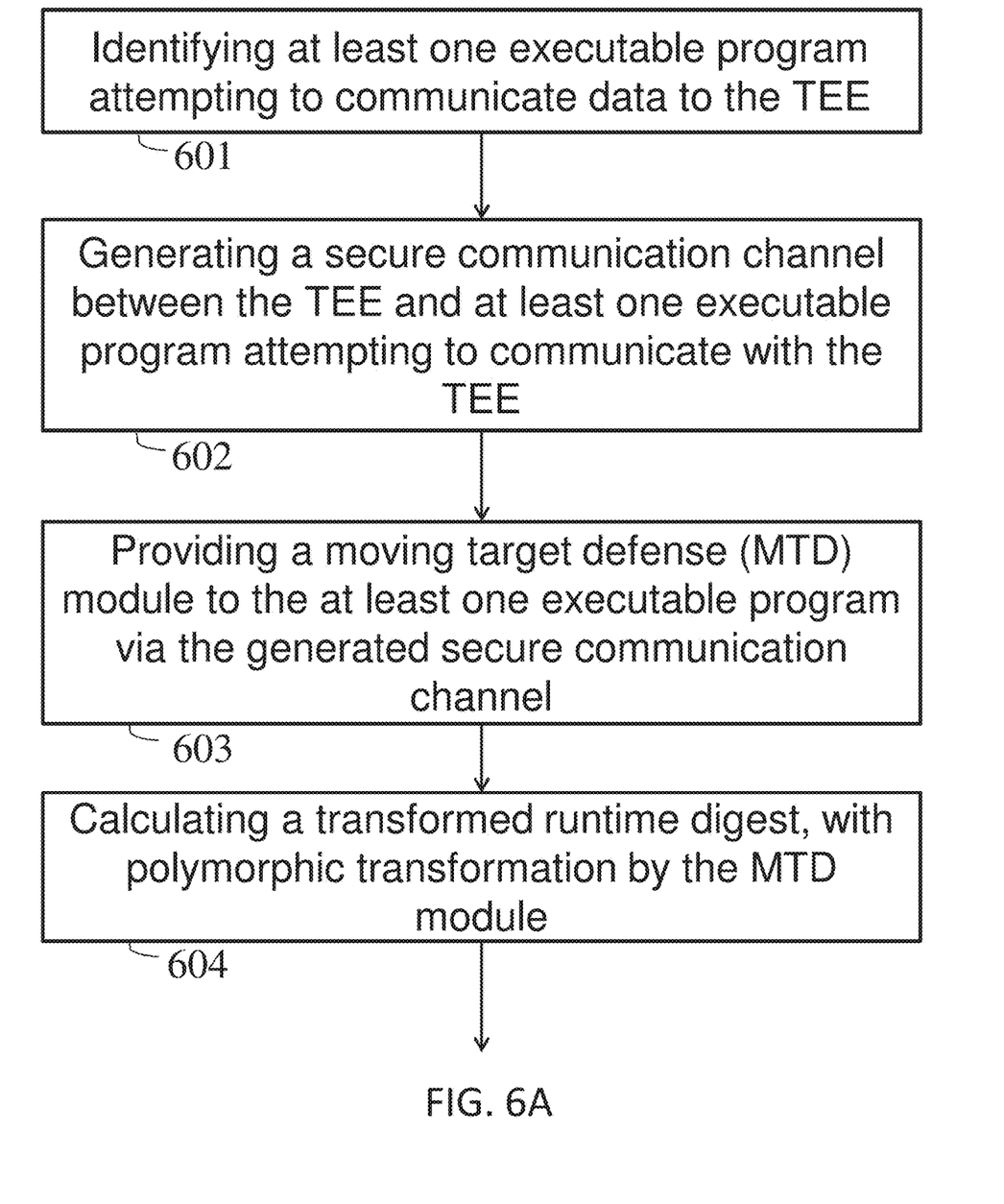
FIGS. 6A-6B show a flowchart of a method of verifying runtime integrity with a TEE, according to some embodiments of the invention.
Figure 6B:
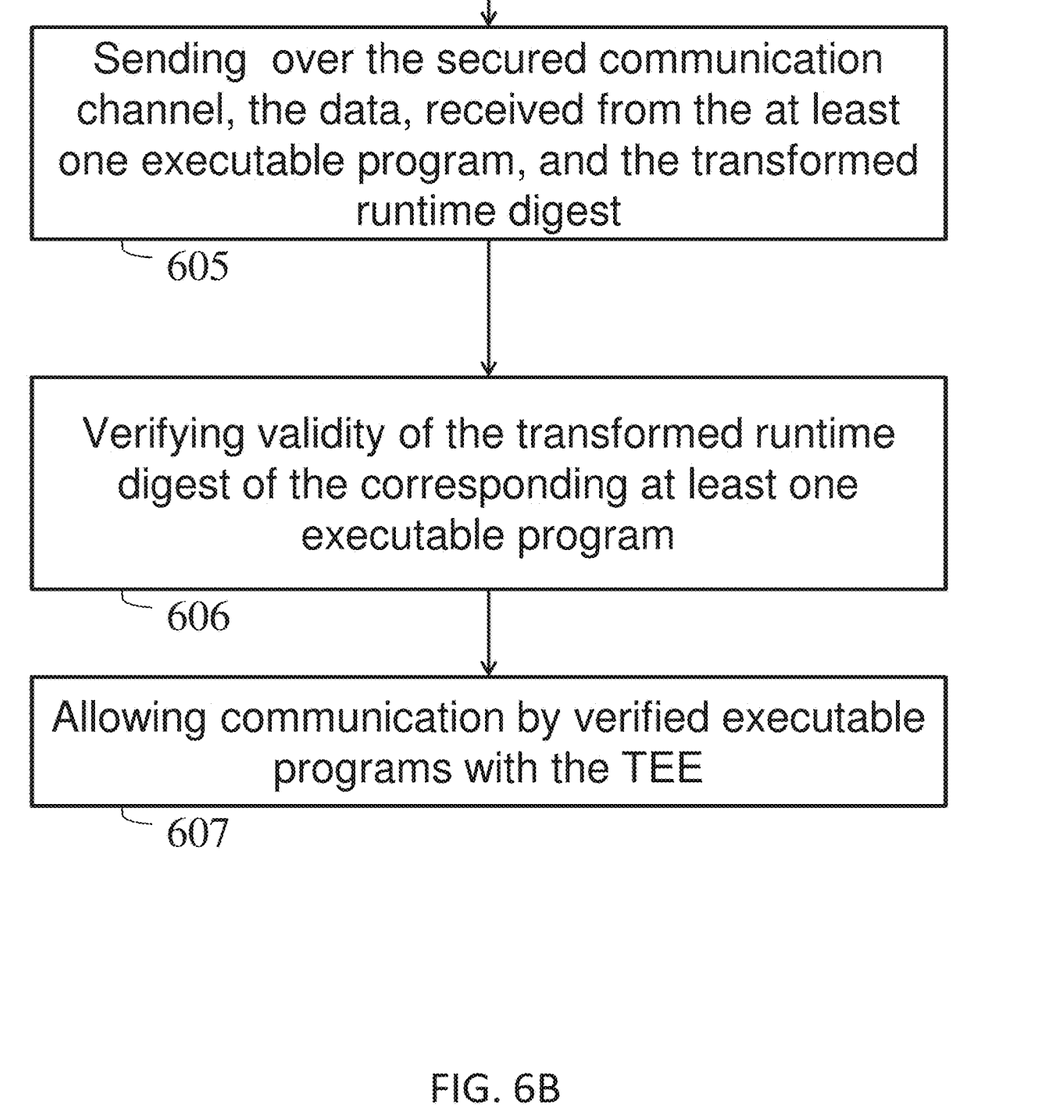

Reference is now made to FIGS. 6A-6B, which show a flowchart of a method of verifying runtime integrity with a TEE, according to some embodiments. While hardware and data structures such as shown in FIGS. 1-5 may be used with the example embodiment of FIG. 6, other structures may be used. At least one executable such as program 20 attempting to communicate with a TEE such as TEE 202 may be identified 601 by a processor 201 in communication with the TEE 202.

A secure communication channel 204 may be generated 602 between the TEE 202 and the being verified at least one executable program 20 (e.g., by processor 201) attempting to communicate with the TEE 202. A moving target defense (MTD) module may be provided 603 to the identified at least one executable program 20 (e.g., by processor 201) via the generated secure communication channel 204. In some embodiments, the MTD module 205 may include disposable polymorphic code. In some embodiments, the disposable code of the MID module 205 may be used to calculate and transform the runtime digest 206 to be sent to the TEE 202.

The transformed runtime digest 206 may be calculated 604 (e.g., by processor 201) with polymorphic transformation by the MTD module 205. For example, a transformed runtime digest 206 may include a hash of the at least one executable program 20 code. In some embodiments, the data received from the identified at least one executable program 20 and the calculated and transformed runtime digest 206 may be cryptographically signed and/or encrypted (e.g., by processor 201). For example, data received from the identified at least one executable program 20 may be any information passed during communication (e.g., a byte of data).

In some embodiments, the received data and transformed runtime digest 206 may be sent 605 to the TEE 202 (e.g., by processor 201). The validity of the received data and transformed runtime digest 206 of the corresponding at least one executable program 20 may be verified 606 (e.g., by processor 201), such that communication by verified executable program 20 with the TEE 202 may be allowed 607 (e.g., by processor 201). In some embodiments, the validity or integrity may be verified by checking consistency between a cryptographic hash of the original code and the transformed runtime digest of the potentially compromised code. For example, in one embodiment, if the result of this check shows that the hash of the original code and the transformed runtime digest of the potentially compromised code are consistent or corresponding to each other, then consistency of the cryptographic hash may be considered to be verified, e.g., the validity of the digest may be considered to be verified; if they are not consistent, the consistency or digest is not verified. When the transformed runtime digest (already including a cryptographic hash) is consistent to the cryptographic hash of the original code, the corresponding at least one executable program 20 may be accordingly verified and communication with the TEE 202 may be allowed. If the check fails (e.g., due to inconsistent hash), the communication with the TEE 202 may be blocked, for instance by the processor 201.

Some embodiments may provide cryptographic verification of the executable code signature in the runtime that may be an improvement over prior methods of cryptographic signatures of files stored on the disk (or other types of persistent storage), as well as a reverse-engineering resilient mechanism, proving to the TEE software that it communicates with the cryptographically authenticated code. Some embodiments may improve the operation of a computer system by ensuring secure communication in which only authorized software or program is allowed to receive services by the TEE. Some embodiments may also improve data verification technology using the moving target defense providing a reverse-engineering resilient mechanism, and proving to the TEE software that it communicates with the cryptographically authenticated code.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may, of course, include features from other embodiments presented, and embodiments not specifically described may include various features described herein.

The invention claimed is:

1. A method of verifying runtime integrity with a trusted execution environment (TEE), the method comprising:
generating, by a processor in communication with the TEE, a secure communication channel between the TEE and at least one executable program attempting to communicate with the TEE;
providing, by the processor, a moving target defense (MTD) module to the at least one executable program via the generated secure communication channel, wherein the MTD module comprises disposable polymorphic code;
sending over the secure communication channel, by the processor:
data, received from the at least one executable program, and
a transformed runtime digest of the at least one executable program; and
allowing, by the processor, communication with the TEE when the validity of the transformed runtime digest of the corresponding at least one executable program is verified.

2. The method of claim 1, wherein generating the secure communication channel comprises at least one of:
encrypting the data and the transformed runtime digest; and
signing the data and the transformed runtime digest.

3. The method of claim 2, further comprising at least one of:
decrypting, by the processor, the received data and the transformed runtime digest at the TEE; and
checking the signature of the received data and the transformed runtime digest.

4. The method of claim 1, further comprising:
identifying, by the processor, at least one memory relocation of at least one data sequence in the data; and
correcting, by the processor, the at least one memory location accordingly.

5. The method of claim 1, further comprising applying a time limit on the verification in a predefined time period.

6. The method of claim 1, further comprising:
mapping, by the processor, all of the verified executable programs during communication with the TEE, as well as the corresponding address in the stack; and
determining, by the processor, a communication pattern for at least one executable program during communication with the TEE.

7. The method of claim 1, wherein the at least one executable program comprises at least one of multi-module native code and interpreted code.

8. The method of claim 1, further comprising allowing, by the processor, communication with the TEE only with previously cryptographically verifying executable programs.

9. A system for verifying runtime integrity, the system comprising:
a trusted execution environment (TEE); and
a processor in communication with the TEE, the processor configured to:
provide a moving target defense (MTD) module to at least one executable program attempting to communicate with the TEE via a generated secure communication channel, wherein the MTD module comprises disposable polymorphic code;
send over the secure communication channel data, received from the at least one executable program, and a transformed runtime digest of the at least one executable program; and allow communication with the TEE when the validity of the transformed runtime digest of the corresponding at least one executable program is verified.

10. The system of claim 9, wherein for the secure communication channel, the processor is further configured to carry out at least one of:
encrypting the data and the transformed runtime digest; and
signing the data and the transformed runtime digest.

11. The system of claim 10, wherein the processor is further configured to carry out at least one of:
decrypting the received data and the transformed runtime digest at the TEE; and
checking the signature of the received data and the transformed runtime digest.

12. The system of claim 9, wherein the processor further comprises a set of signature generation tools to generate at least one signature for verification.

13. The system of claim 9, wherein the processor is further configured to:
identify at least one memory relocation of at least one data sequence in the data; and
correct the at least one memory relocation accordingly.

14. The system of claim 9, wherein the processor is further configured to apply a time limit on the verification in a predefined time period.

15. The system of claim 9, wherein the processor is further configured to:
map all of the verified executable program segments during communication with the TEE, as well as the corresponding address in the stack; and
determine a communication pattern for at least one executable program during communication with the TEE.

16. The system of claim 9, wherein at least one executable program comprises at least one of multi-module native code and interpreted code.

17. The system of claim 9, wherein the TEE is implemented by a computing component external to the processor.

18. The system of claim 9, wherein the TEE is implemented on the computing device of the processor.

19. The system of claim 9, wherein the processor is further configured to allow communication with the TEE only with previously cryptographically verifying executable programs.

20. A method of verifying runtime integrity with a trusted execution environment (TEE), the method comprising:
generating, by the processor, a secure environment between the TEE and at least one executable program attempting to communicate with the TEE;
providing, by the processor, disposable polymorphic code to the at least one executable program via the generated secure environment;
sending, by the processor, data, received from the at least one executable program, to the TEE; and
allowing, by the processor, communication with the TEE when the validity of the transformed runtime digest of the corresponding at least one executable program is verified.

* * * * *